United States Patent [19]

Gongwer

[11] Patent Number: 4,726,183
[45] Date of Patent: Feb. 23, 1988

[54] SELF RETRACTING SCREENS FOR TURBOMACHINERY

[75] Inventor: Calvin A. Gongwer, Glendora, Calif.

[73] Assignee: Innerspace Corporation, Glendora, Calif.

[21] Appl. No.: 32,945

[22] Filed: Mar. 30, 1987

Related U.S. Application Data

[63] Continuation of Ser. No. 822,918, Jan. 24, 1986, abandoned, which is a continuation of Ser. No. 600,501, Apr. 16, 1984, abandoned.

[51] Int. Cl.⁴ .............. B63H 11/00; B63H 5/16
[52] U.S. Cl. .................. 60/221; 415/121 G; 415/152 A; 416/247 A; 440/72
[58] Field of Search ............ 60/221, 222, 39.092; 415/121 G, 152 A, 152 R; 416/247 A, 247 R; 440/20, 71, 72

[56] References Cited

U.S. PATENT DOCUMENTS

| | | | |
|---|---|---|---|
| 1,173,568 | 2/1916 | Griffin | 416/247 |
| 2,623,610 | 12/1952 | Buechel | 415/121 G |
| 2,695,074 | 11/1954 | Kelly | 60/39.092 |
| 2,928,497 | 3/1960 | Stockdale | 60/39.092 |
| 3,343,368 | 9/1967 | Castoldi | 60/221 |
| 3,658,028 | 4/1972 | Koons | 440/71 |
| 3,889,624 | 6/1975 | Balius | 440/72 |
| 4,055,947 | 11/1977 | Gonguer | 60/221 |

FOREIGN PATENT DOCUMENTS

| | | | |
|---|---|---|---|
| 625522 | 2/1936 | Fed. Rep. of Germany | 416/247 |
| 2344445 | 10/1977 | France | 415/121 G |
| 674480 | 11/1964 | Italy | 440/72 |
| 836626 | 6/1960 | United Kingdom | 416/247 |

Primary Examiner—Louis J. Casaregola
Assistant Examiner—Timothy S. Thorpe
Attorney, Agent, or Firm—Lyon & Lyon

[57] ABSTRACT

A self retracting screen for turbomachinery comprised of a number of interlocking wires, the wire ends being pivotally attached to the periphery of the normal inlet of the turbomachinery. Preferably, the wires are elliptical, or streamlined, in cross-section such that the major diameters of the elliptical cross-section of the wires when the screen is closed are substantially parallel to the turbomachinery inlet stream.

9 Claims, 5 Drawing Figures

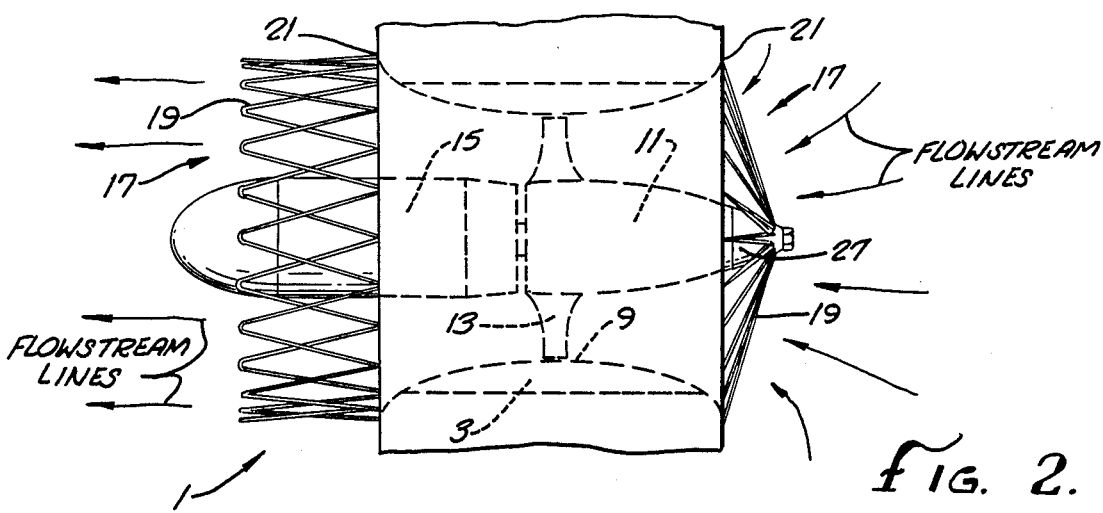
Fig. 2.
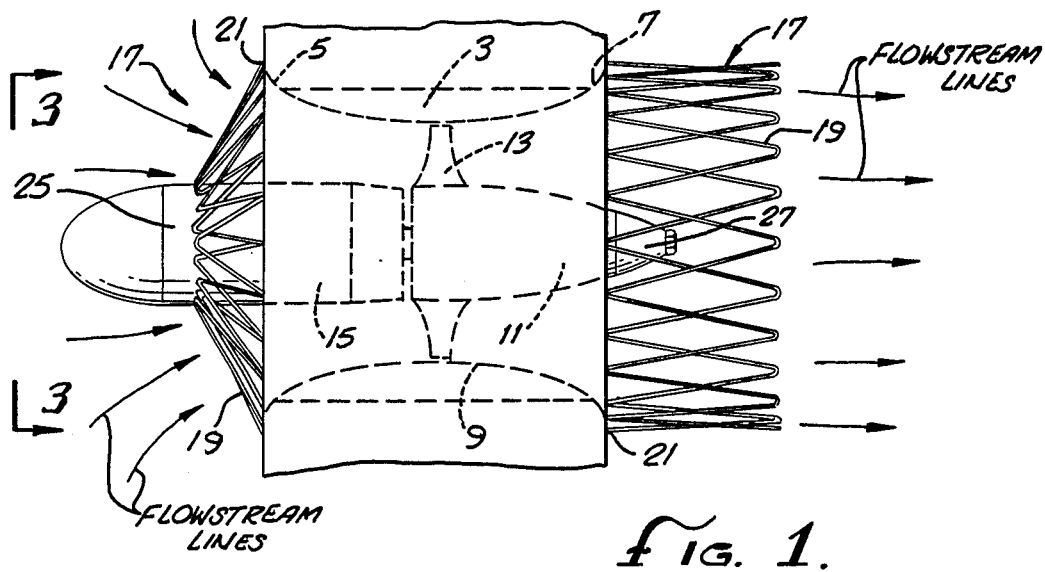
Fig. 1.
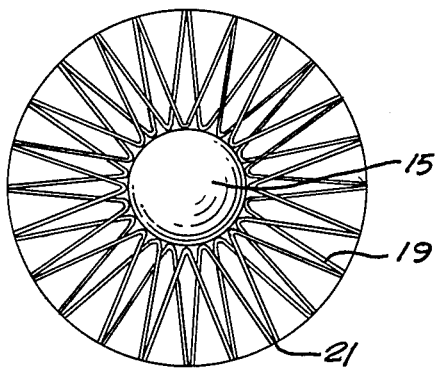
Fig. 3.
Fig. 4.
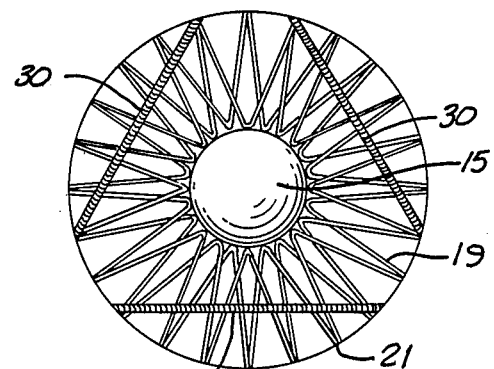
Fig. 5.

SELF RETRACTING SCREENS FOR TURBOMACHINERY

BACKGROUND OF THE INVENTION

This application is a continuation of application Ser. No. 822,918 filed Jan. 24, 1986, which is a continuation of application Ser. No. 600,501 filed Apr. 16, 1984, both now abandoned.

FIELD OF THE INVENTION

This invention relates to turbomachinery and in particular, thrusters having a self retreating screen.

DESCRIPTION OF THE PRIOR ART

The prior art includes the U.S. Pat. No. 4,055,947 titled Hydraulic Thruster granted Nov. 1, 1977 and U.S. Pat. Nos. 4,137,709 and 4,213,736 both titled Turbomachinery and Method of Operation, issued Feb. 6, 1979 and July 22, 1980, respectively. The basic design relationship for turbomachinery is defined by the Euler Turbine equation, a form to Newton's Laws of Motion as applied to fluid traversing a rotor, see generally, Shepard Principles of Turbomachinery, Energy Transfer Between a Fluid and a Rotor (McMillan Co., McMillan & Co., 1965).

It is desirable to prevent the ingestion of injurious debris into turbomachinery such as thrusters. Such equipment can be damaged by such debris and the propeller or shaft seal rendered inoperable. In order to prevent such damage to turbomachinery, fixed screens have been positioned at one or both ends of the turbomachinery. However, such fixed screens cause a major loss of thrust and energy in the turbomachinery exit jet.

SUMMARY OF THE INVENTION

The present invention is directed to turbomachinery preferably a thruster, having an inlet, an outlet, a throat section and an impeller wherein a plurality of interlocking wires have their ends pivotally attached to the periphery of the turbomachinery inlet. In a preferred embodiment, such turbomachinery has a self retracting screen made up of such interlocking wires positioned at both the inlet and the outlet such that during operation the screen is closed at the inlet in order to provide protection of the turbomachinery internals and, is pivoted outwardly at the turbomachinery exit to minimize loss of thrust and energy in the exit jet.

BRIEF DESCRIPTION OF THE DRAWINGS

FIGS. 1 and 2 are partial cross-sectional views illustrating the present invention.

FIG. 3 is an end view of the present invention taken about plane 3—3 of FIG. 2.

FIG. 4 is a cross-sectional view of a wire.

FIG. 5 is an end view of the present invention with tension means.

DESCRIPTION OF THE PREFERRED EMBODIMENT

Referring now to FIG. 1, turbomachinery, generally referred to as 1, includes a housing 3 which is preferably fabricated from syntactic foam thereby forming a normal inlet 5, a normal outlet 7 and a throat 9. Positioned within the throat 9 is an impeller 11 having at least one impeller blade 13 driven by motor 15.

The self retracting screen, generally referred to as 17, is made up of a plurality of interlocking wires 19. The wires 19 may be formed in the shape of a semi-circle or, as is shown in FIGS. 1, 2 and 3, in a triangular shape having an apex. The ends 21 of the wires 19 are pivotally attached to the periphery of the normal inlet 5 of the turbomachinery, such that the wires 19 may swing inwardly when the turbomachinery is operated in the direction such that the normal inlet 5 is the inlet, as shown in FIG. 1; and retract, by swinging outwardly, when the turbomachinery is operated in the opposite direction, such that the normal inlet 5 becomes the outlet, as shown in FIG. 2. The wires are interlocking in that they are engaged or interrelated with one another such that the swinging motion of one of the wires 19 is constrained by another wire in that they both must swing together.

In the preferred embodiment the turbomachinery 1 is a thruster which is operable in both directions and is provided with a self retracting screen 17 at both the normal inlet 5 and the normal outlet 7. As shown in FIG. 1, when closed, the self retracting screen 17 attached to the periphery of the normal inlet 5, may rest on the case 25 of the hydraulic motor 15. As shown in FIG. 2, the self retracting screen 17 attached to the periphery of the normal outlet 7, may be provided with a screen stop such as a carbon stop 27 which allows for the self retracting screen 17 to find support when the turbomachinery is operated in the reverse direction as shown in FIG. 2. FIG. 3 is an end view showing the self retracting screen 17 attached to the periphery of the normal inlet 5 in the closed position.

FIGS. 1 and 2 illustrate intake and exit streamlines through the turbomachinery 1. Entering streamlines drag the self retracting screen 17 into the closed position as they enter the turbomachinery 1 and force the self retracting screen 17 into its retracted position at the exit of the fluid streamline thereby cleaning such self retracting screen 17 of any debris and minimizing drag. The stop 27 is preferably fabricated of carbon in order to reduce both wear and friction.

As shown in FIG. 4, the wires 19 may be of an elliptical cross-section such that the major diameter of the elliptical cross-section of the wires 19 are substantially parallel to the turbomachinery inlet stream when the self retracting screen 17 is in the closed position.

In some instances, as shown in FIG. 5, it may be desirable to install a biasing means for quick closure of the self retracting screen 17 when the direction of operation of the turbomachinery is changed. A first and second biasing means, each shown as three tension springs 30, are attached to the periphery of the normal inlet 5 and the normal outlet 7 respectively such that the tension springs 30 constitute chords. The tension springs 30 are configured such that they do not create undue drag when the self retracting screen 17 is in the closed position. The spring constant should be sufficient to urge the self retracting screen 17 closed and still allow the exit streamlines to force the self retracting screen 17 into the retracted position.

In operation, as shown in FIG. 1, the water flow through the turbomachinery 1 causes the self retracting screen 17 at the normal outlet 7 to retract and closes the self retracting screen 17 at the normal inlet 5, thereby increasing the screen area at the inlet when the self retracting screen 17 is closed and decreasing the drag at the outlet when the self retracting screen 17 is retracted. As shown more clearly in FIG. 3, the generally conical shape of the self retracting screen 17 when it is in the closed position increases the screen area and keeps the self retracting screen 17 out of the high velocity region at the plane of the normal inlet 5 of the turbomachinery 1 in order to reduce drag. As also illustrated in FIG. 3, the ends 21 of the wires 19 of the self retracting screen 17 are pivotally attached at the maximum diameter of the turbomachinery 1 in order to further reduce drag.

Test data has shown that in some instances the particular type of fine turbulence produced by the self-retracting screen 17 attached at the normal inlet 5 results in a 5% increase in thrust for the same shaft power, or an 8% increase in effective power. The reason for this can be traced to the beneficial effects known to be provided by stream turbulence in suppressing varying degrees of flow separation.

Thus, a self retracting screen capable of protecting the internals of turbomachinery and yet avoiding the major losses of thrust experienced by the use of fixed screens is disclosed. Having described this invention and its preferred embodiments in detail, it is understood that certain modifications may be made to the described invention by those skilled in the art without departing from the inventive concepts disclosed herein. As such the scope of the disclosed invention is not to be restricted or narrowed except in the spirit of the appended claims.

What is claimed:

1. Turbomachinery with a self retracting screen comprising:
   turbomachinery including
   a normal inlet;
   a normal outlet;
   an impeller positioned for axial rotation within said turbo machinery;
   a screen stop which is located at the approximate centerline of the turbomachinery flow path and upstream of said normal inlet to the turbomachinery; and,
   a plurality of interlocking wires, said wires having wire ends and a mid section between said wire ends, said wire ends being pivotally attached to the periphery of said normal inlet to the turbomachinery and said mid section between said wire ends being unattached; said wires being moveable between a closed position and a retracted position, in said closed position a segment of said mid section between said wire ends of each of said wires rests unattached against said screen stop screening said normal inlet; and in said retracted position said mid section between said wire ends do not rest against said screen stop.

2. The turbomachinery claimed in claim 1 wherein said wires are substantially similar in configuration.

3. The turbomachinery claimed in claim 2 wherein said wires are of a semi-circular shape.

4. The turbomachinery claimed in claim 2 wherein said wires are triangularly shaped having an apex.

5. The turbomachinery claimed in claim 1 further comprising a motor case; a second plurality of interlocking wires, said wires having wire ends and a mid section between said wires ends; said wire ends being pivotally attached to the periphery of said normal outlet of the turbomachinery and said mid section between said wire ends being unattached; said wires being removeable between a closed position and a retracted position, in said closed position a segment of said mid section between said wire ends of each of said wire rests unattached against said motor case screening said normal outlet, in said retracted position said mid section between said wire ends do not rest against said motor case.

6. The turbomachinery claimed in claim 1 wherein said wires are elliptical in cross-section such that the major diameter of the elliptical cross-section of said wires is substantially parallel to said turbomachinery inlet stream when the screen is closed.

7. A thruster with a self retracting screen comprising:
   a thruster normal inlet;
   a thruster normal outlet;
   a thruster throat section between said normal inlet and said normal outlet;
   an impeller positioned for bi-directional rotation within said throat; a screen stop which is located at the approximate centerline of the turbomachinery; and
   a plurality of interlocking wires, said wires having wire ends, said wire ends being pivotally attached to the periphery of said normal inlet to the turbomachinery, said wire being moveable between a first position and a second position; in said first position a segment of each of said wires intermediate said wire ends rests unattached against said screen stop; and, in said second position said wires do not rest against said screen stop.

8. A thruster having a self retracting screen comprising:
   a thruster normal inlet;
   a thruster normal outlet;
   a thruster throat section located between said thruster normal inlet and normal outlet;
   an impeller positioned for bi-directional rotation within said thruster throat; a screen stop which is located at the approximate centerline of the turbomachinery flow path and upstream of said normal inlet to the turbomachinery;
   a motor case; and
   two sets of a plurality of interlocking wires, said wires having wire ends, said wire ends of said first set being pivotally attached to the periphery of said thruster normal inlet and said wire ends of said second set being pivotally attached to the periphery of said thruster normal outlet, said first set of interlocking wires and said second set of interlocking wires being moveable between a closed position and a retracted position in said closed position said first set of interlocking wires rests unattached against said screen stop; in said retracted position said second set of interlocking wires does not contact said motor case; in said retracted position said first set of interlocking wires does not contact said screen stop; and, in said closed position said second set of interlocking wires rests unattached against said motor case.

9. The thruster claimed in claim 8 wherein said wires are elliptical in cross-section such that the major diameter of the elliptical cross-section of said wires when the screen is closed is substantially parallel to the thruster inlet stream.

* * * * *